June 20, 1961    B. L. PENNER    2,989,340
QUICK DETACHABLE HINGING STRUCTURE
Filed Feb. 29, 1960    3 Sheets-Sheet 1
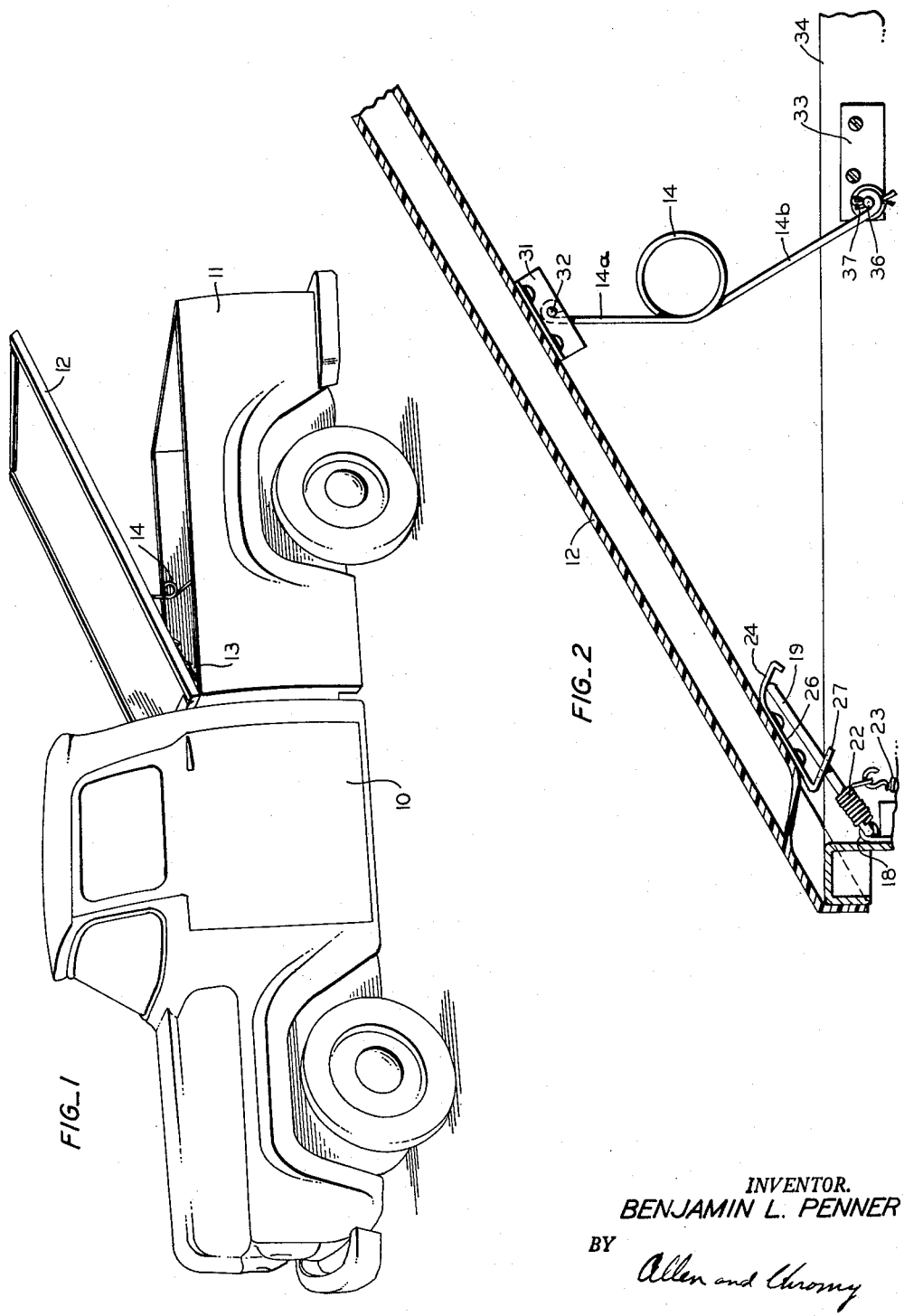
INVENTOR.
BENJAMIN L. PENNER
BY
ATTORNEYS

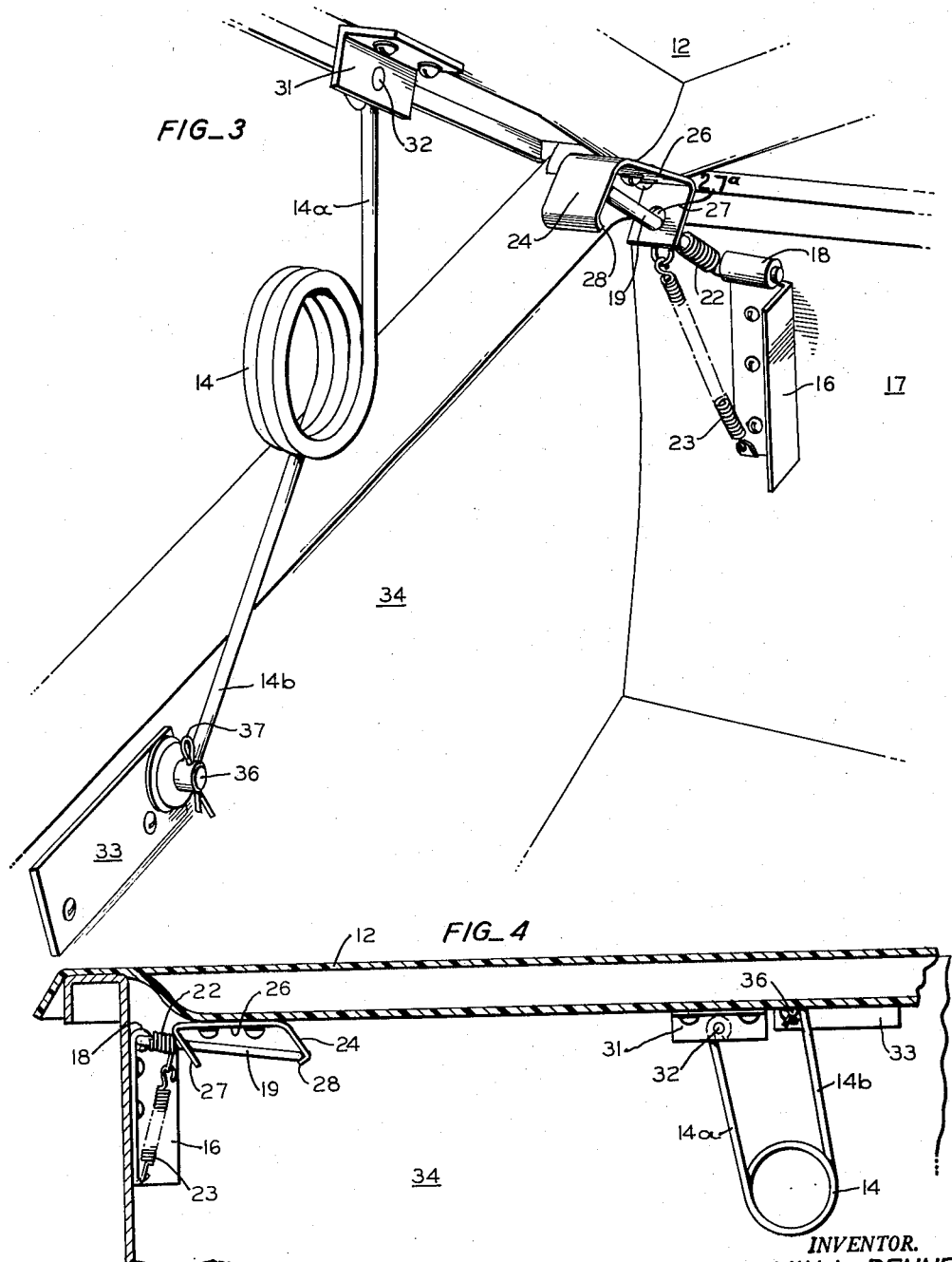

June 20, 1961 B. L. PENNER 2,989,340
QUICK DETACHABLE HINGING STRUCTURE
Filed Feb. 29, 1960 3 Sheets-Sheet 3
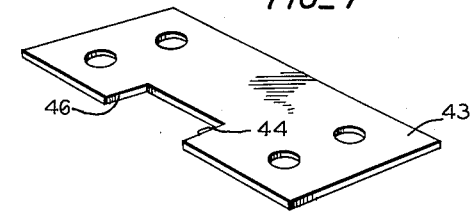
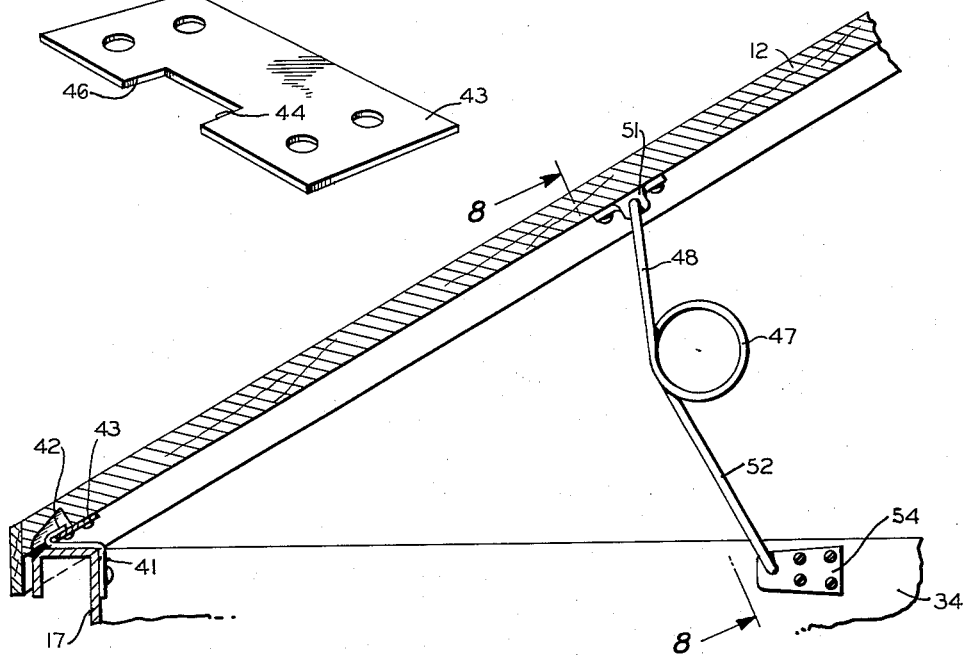
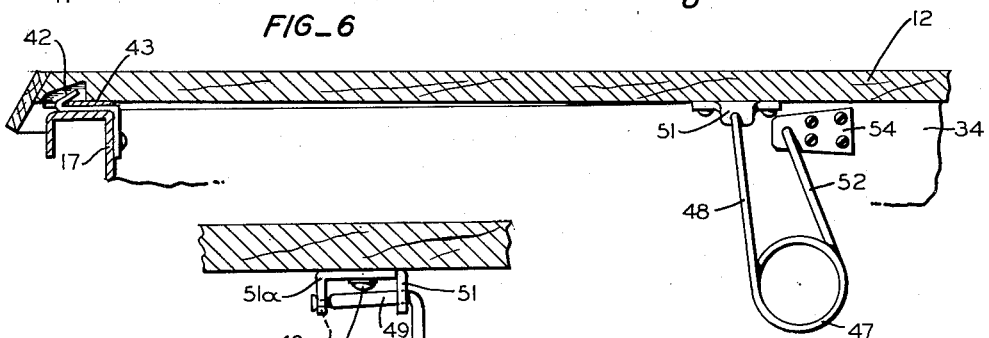
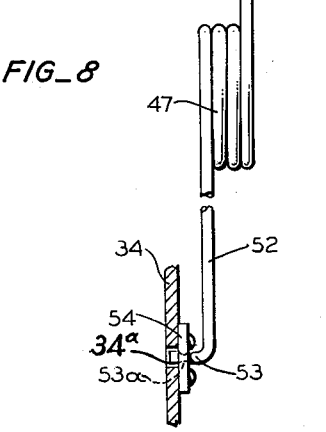
INVENTOR.
BENJAMIN L. PENNER
BY
Allen and Chromy
ATTORNEYS

2,989,340
QUICK DETACHABLE HINGING STRUCTURE
Benjamin L. Penner, 348 Johnson Ave., Los Gatos, Calif., assignor of forty-nine percent to Evert J. Amick, Los Gatos, Calif.
Filed Feb. 29, 1960, Ser. No. 11,851
5 Claims. (Cl. 296—100)

The present invention relates to quick detachable mounting means for the cover for the bed of a pick-up truck and is concerned more particularly with improved mounting means or a hinging structure which provides for free engagement and disengagement of the hinge elements by relative movement between the cover and the bed of the truck, and the hinging structure also includes spring means for holding the top in open and in closed position and which also serve to keep the hinge elements engaged with each other.

It is a general object of the invention to provide a load-carrying cover or top for the bed of a pick-up truck which has a quick detachable mounting and which is readily moved between open and closed positions.

Another general object of the invention is to provide a quick detachable mounting for the top or cover of the bed of a pick-up truck whereby the top and its mounting structure can be readily adjusted between installed and removed positions.

Still another object of the invention is to provide an improved spring hinge mounting structure for the top or cover of the bed of a pick-up truck.

The above and other objects of the invention are obtained as described in the acccompanying specification made with reference to the attached drawings, in which:

FIG. 1 is a perspective view of a pick-up truck embodying the present invention;

FIG. 2 is a fragmentary longitudinal sectional view through the forward portion of the top and of the truck bed showing the hinging structure in its open position;

FIG. 3 is a perspective view of one side of the hinging structure shown in open position;

FIG. 4 is a fragmentary longitudinal sectional view similar to FIG. 2 with the top in closed position.

FIG. 5 is a fragmentary longitudinal sectional view similar to FIG. 2 but showing a modified form of hinging structure;

FIG. 6 is a fragmentary longitudinal sectional view similar to FIG. 5 and showing the top in closed position;

FIG. 7 is a perspective view of one of the hinge elements;

FIG. 8 is a fragmentary sectional view taken in planes indicated by the line 8—8 in FIG. 5.

Referring to FIG. 1 the invention is illustrated in connection with a conventional pick-up truck 10 having a bed 11, with a top 12 hingedly mounted thereon in quick detachable fashion by means of two sets of hinge elements indicated generally at 13 at the front and two spring structures 14 located rearwardly of the hinge elements, only one hinge element 13 and spring structure 14 are seen.

Referring to FIGS. 2, 3 and 4, one set of hinge element at the forward end of the truck bed includes an angle 16 secured to the forward wall 17 of the bed and having a rolled hinge element 18 at the upper end thereof to receive the bent forward end of a hinge pin 19. The hinge pin 19 is urged downwardly by a tension spring 23 secured between the hinge pin and the bracket 16 in suitable fashion, a coil spring 22 providing the fastening means for spring 23 to the pin 19. For cooperation with the pin 19 there is provided a generally U-shaped bracket 26 secured to the underface of the top, and having opposed ends 27 and 24. The end 27 is apertured at 27a to pass the pin 19 and the end 24 is solid to provide a stop for the pin 19, its lower edge being bent inwardly at 28 to provide a latching lip. It will be seen that by rearward movement of the top 12, the bracket 26 can be removed from the pin 19 with which it is telescopically engaged.

The other portion of the hinging structure and top mounting means comprises the coil spring 14 previously described which has its upwardly extending end 14a bent to form an eye to engage about a headed pin 32 secured in an angle bracket 31 secured to the top. The lower extending end 14b of the coil spring 14 has its lower end bent to form an eye engaging about a pin 36 on a bracket 33 secured to the sidewall 34 of the bed of the truck. The pin 36 is apertured to receive a cotter pin 37 to secure the end 14b in place.

With the parts positioned as shown in FIG. 3 by removing the cotter pin 37 on each side of the mounting structure, it will be seen that the lower end 14b can be moved laterally off the pin 36 at either side and then the top can be withdrawn to disengage the respective brackets 26 from the pins 19 so that the top can be readily removed. The reverse operations are employed when installing the top.

Referring to FIGURES 5 through 8, a modified hinging structure is provided including an L-shaped bracket 41 secured at each side of the front wall 17 of the bed 11. The upper end of the bracket 41 is bent to provide a forwardly extending securing element or lug 42 which is embraced by a recessed portion 44 of a bracket 43 secured to the underside of the wooden top 12, which is recessed to accommodate the lug 42. It is seen, therefore, that the bracket 43 and the associated mounting element 41 are telescopically engaged, and have means preventing relative lateral movement when engaged similar to the parts 19 and 16 previously described.

The spring portion of the detachable mounting comprises the coil spring 47 which is generally similar to the spring 14 and has upwardly extending arm 48 including a bent end 49 which is bent past the 90 degree position and is engaged in aligned apertures in the opposite walls 51 and 51a of the U-shaped bracket 52 secured to the underside of the top. Adjacent its end the bent portion 49 is provided with a groove 49a for releasable latching engagement with the aperture of the wall 51a being held therein by virtue of a bending or springing of the arm 48 during connection to the wall of the truck bed. The downwardly extending arm 52 of the spring 47 has a bent lower end 53 which has an annular recess 53a to engage in a hole or aperture in the bracket 54 secured to the sidewall 34 of the truck. If desired, a suitable recess 34a may be provided in the wall 34 to accommodate the end of the spring 53. This bent end 53 is also held in the bracket 54 by virtue of the urgency of the spring member 47 and the constant pressure exerted. However, when it is desired to remove the top the arm 52 can be flexed slightly to release its bent end 53 from the bracket 54 and after it is removed therefrom, the top can be slipped rearwardly to disengage the bracket 53 and its associated fastening element 42.

It will be noted that the spring element 47, in the position shown in FIGS. 2 and 5 will hold the top in open position. When the top is moved to closed position, the spring will be moved to the position shown respectively in FIGS. 4 and 6 where the pressure of the spring will tend to maintain the closed position of the top.

While I have shown and described certain preferred embodiments of the invention, it will be apparent that the invention is capable of variation and modification from the form shown so its scope should be limited only by the scope of the claims appended hereto.

I claim:
1. In combination with the bed of a pick-up truck and the top for said bed, of a mounting structure for mounting said top in quick detachable fashion on the bed of the truck, said mounting structure including a pair of hinge elements, one of said elements being mounted on the bed of the truck and the other of said elements being mounted on said top at the forward end thereof and having telescoping engagement with the first hinge element on the truck bed, said mounting structure also including a coil spring having extending ends, one of said ends being pivotally connected to a top part intermediate the ends of said top, and the other end being pivotally connected to a bed part intermediate the ends of the bed, and one of said ends being movable laterally to be disengaged from the associated part so as to enable removal of the top from the bed of the truck, said spring normally serving to maintain said telescoping engagement of said hinge elements.

2. In a combination as recited in claim 1, in which said hinge elements include engaging parts to restrict lateral movement of the top with respect to the bed of the truck in the engaging position thereof.

3. In a combination as recited in claim 1, in which said coil spring has one of its extending end portions bent laterally for engagement with the bed of the truck and being retained therein by a frictional latching engagement.

4. In a combination as recited in claim 1, in which said one of said hinge elements has a projecting portion and the other of said hinge elements has a portion formed to embrace said projecting portion.

5. In combination with the bed of a pick-up truck and the top for said bed, of a mounting structure for mounting said top in quick detachable fashion on the bed of the truck, said mounting structure including a pair of hinge elements, one of said elements being mounted on the bed of the truck and the other of said elements being mounted on said top at the forward end thereof and having free detachable engagement with the first hinge element on the truck, said mounting structure also including a coil spring having extending ends, one of said ends being connected to a top part intermediate the ends thereof, and the other end being connected to a bed part intermediate the ends of the bed, and one of said ends being quickly detachable from the associated part so as to enable removal of the top from the bed of the truck, said spring normally serving to maintain said detachable engagement of said hinge elements.

References Cited in the file of this patent
UNITED STATES PATENTS

| | | |
|---|---|---|
| 684,940 | Krebs | Oct. 22, 1901 |
| 1,481,543 | Eke | Jan. 22, 1924 |
| 2,582,635 | Kipple | Jan. 15, 1952 |
| 2,886,375 | Crawford | May 12, 1959 |

FOREIGN PATENTS

| | | |
|---|---|---|
| 675,968 | Great Britain | July 16, 1952 |